March 9, 1965   C. P. LENT   3,172,233
ELECTRICALLY OPERATED SHIP MODEL
Filed Dec. 4, 1961   8 Sheets-Sheet 4
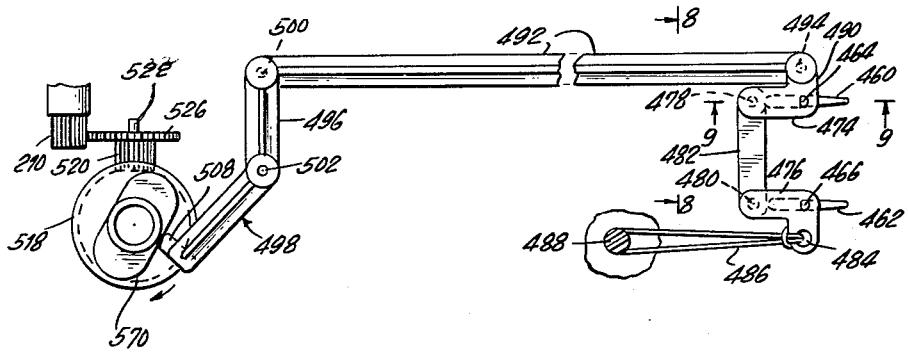
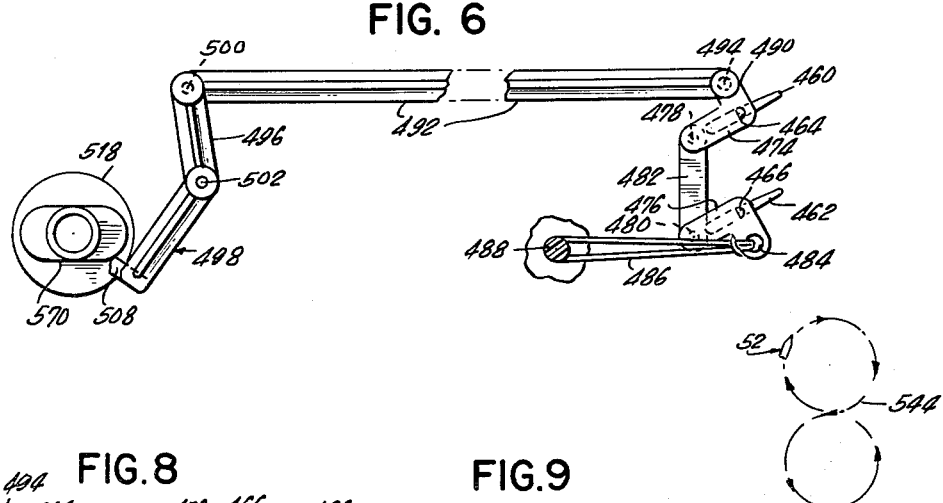
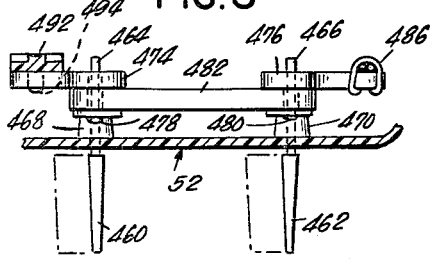
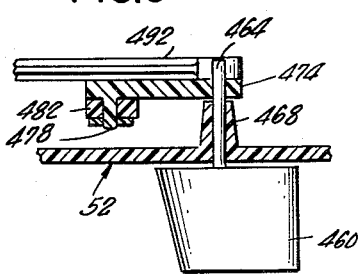
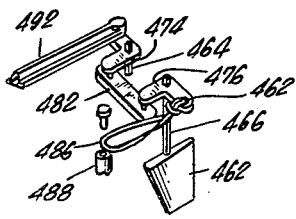
INVENTOR.
CONSTANTIN P. LENT
BY Amster & Levy
ATTORNEYS March 9, 1965 C. P. LENT 3,172,233
ELECTRICALLY OPERATED SHIP MODEL
Filed Dec. 4, 1961 8 Sheets-Sheet 5
FIG.15
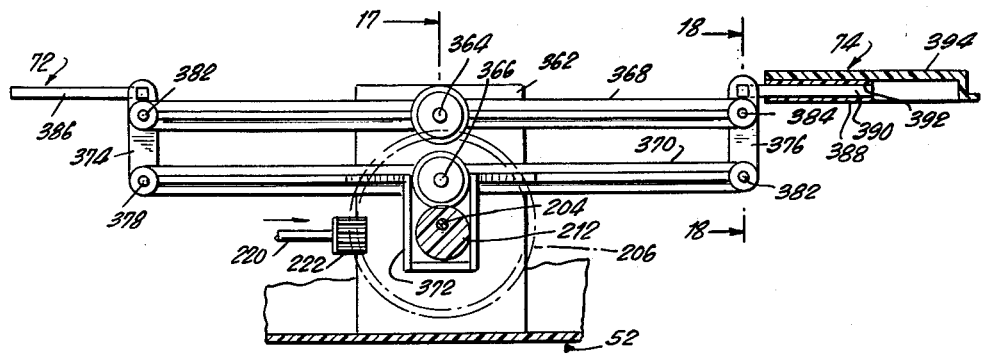
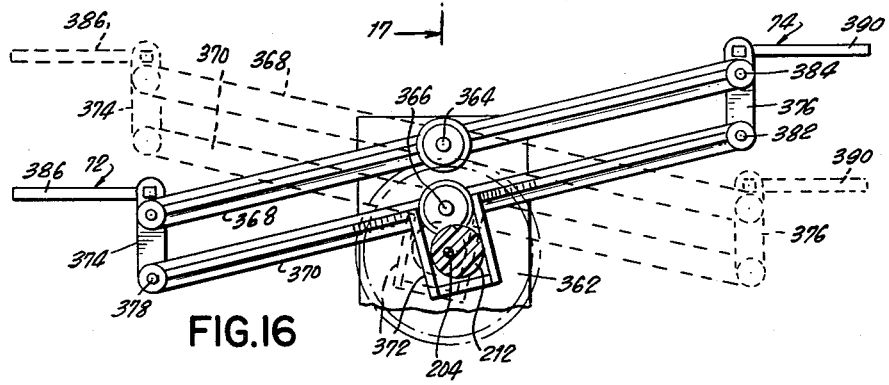
FIG.16
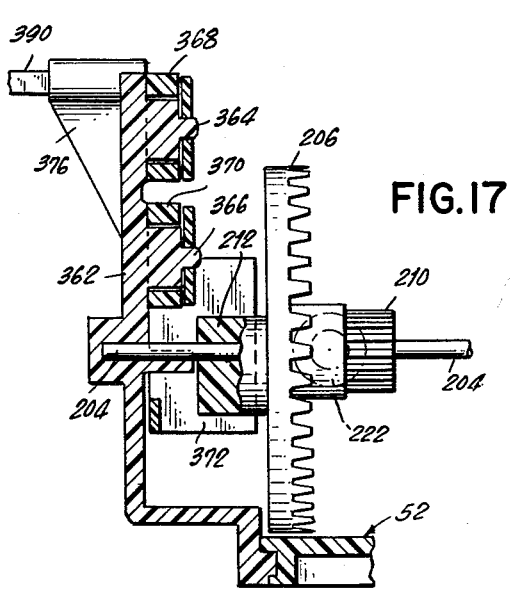
FIG.17
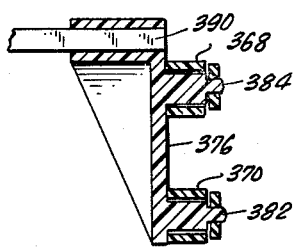
FIG. 18
INVENTOR.
CONSTANTIN P. LENT
BY Amster & Levy
ATTORNEYS March 9, 1965 C. P. LENT 3,172,233
ELECTRICALLY OPERATED SHIP MODEL
Filed Dec. 4, 1961 8 Sheets-Sheet 6

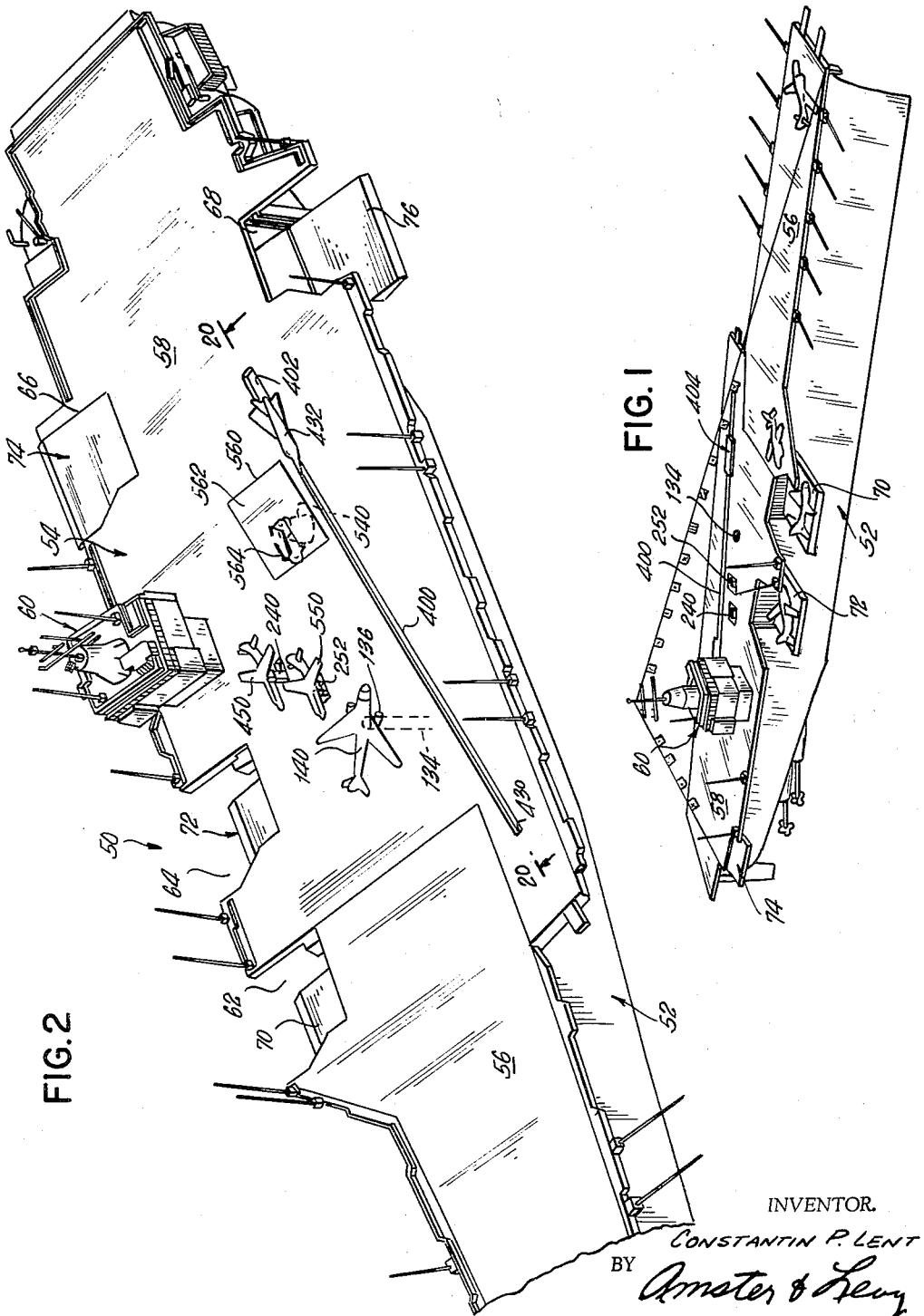

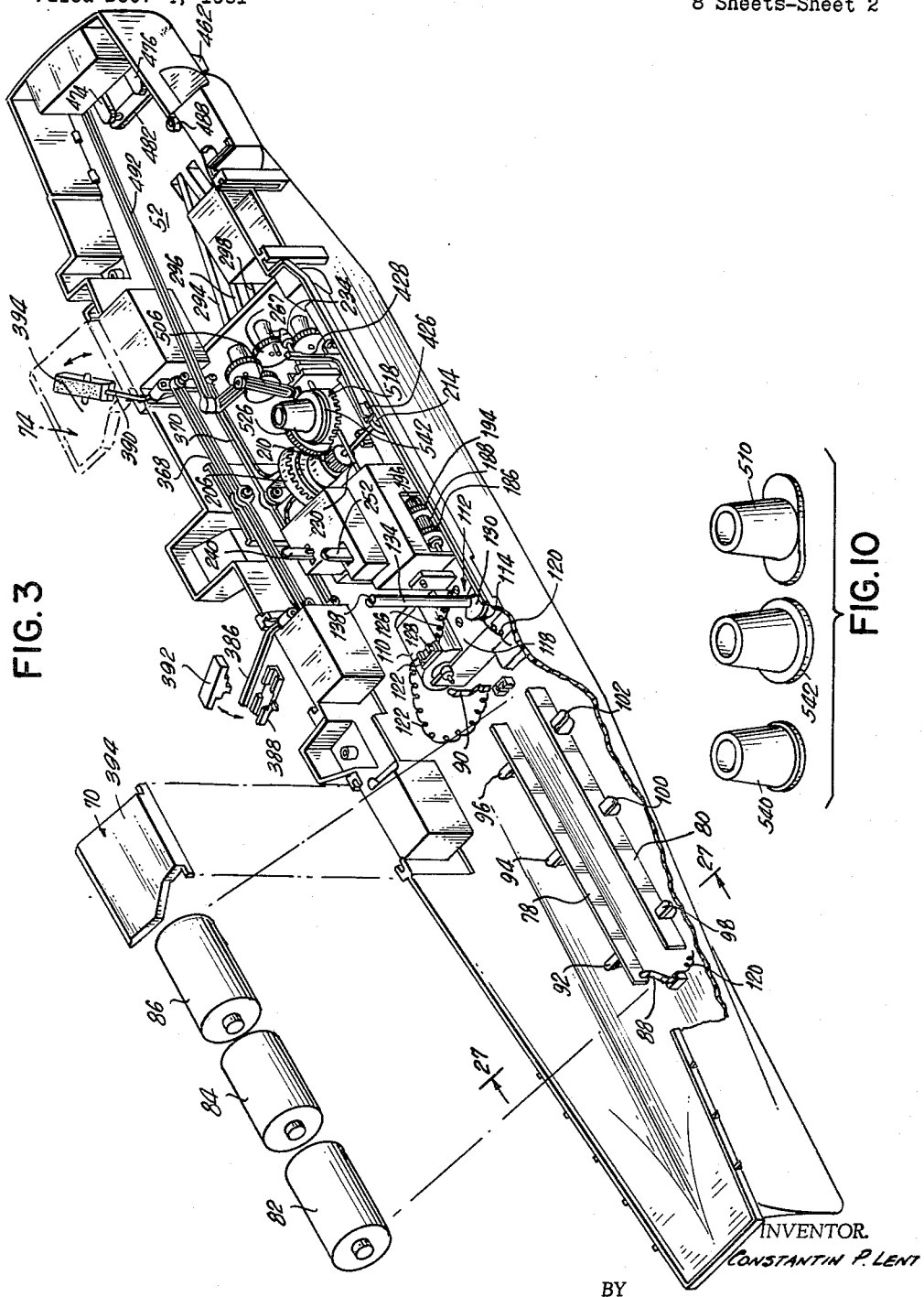

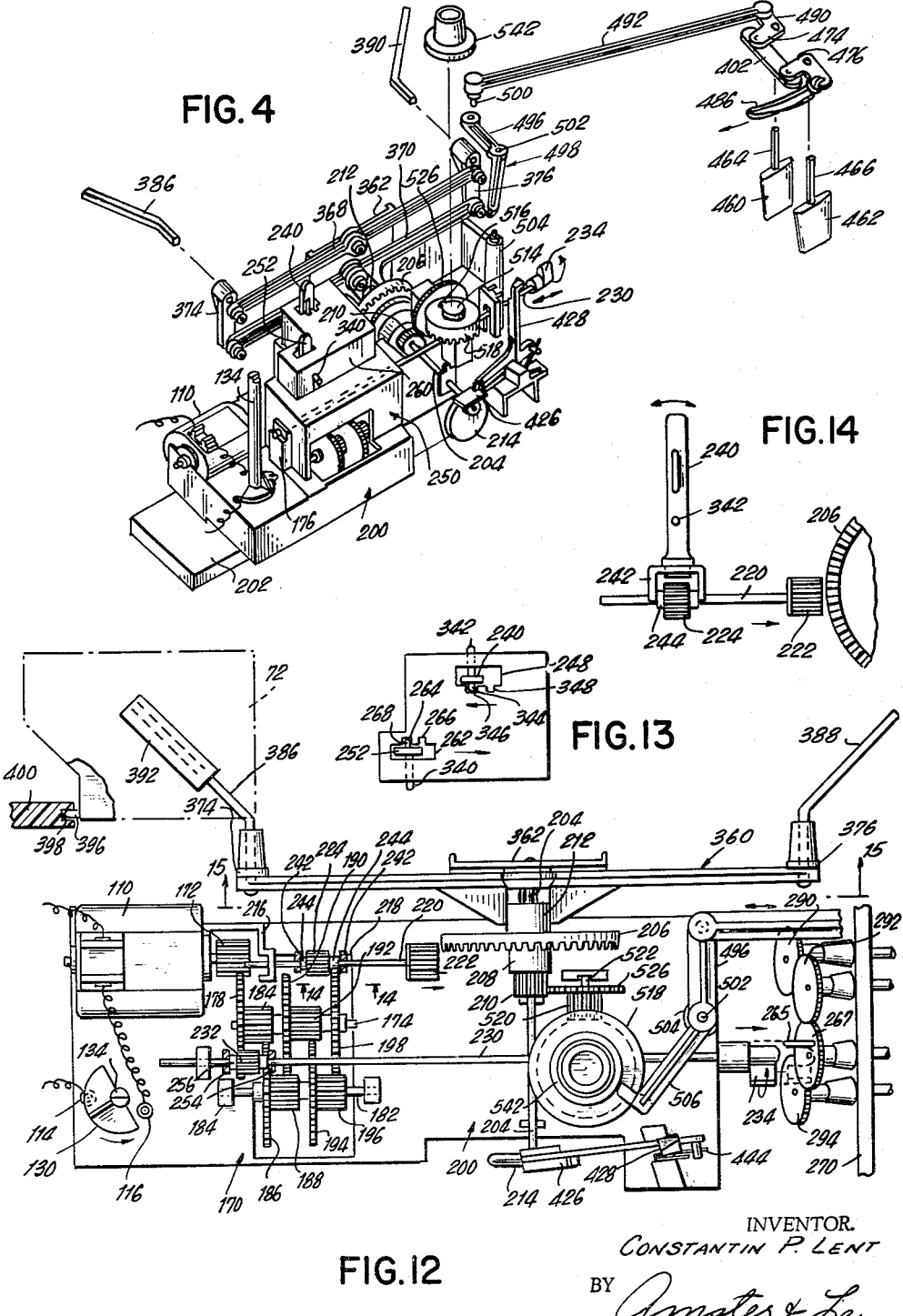

INVENTOR.
CONSTANTIN P. LENT
BY
ATTORNEYS

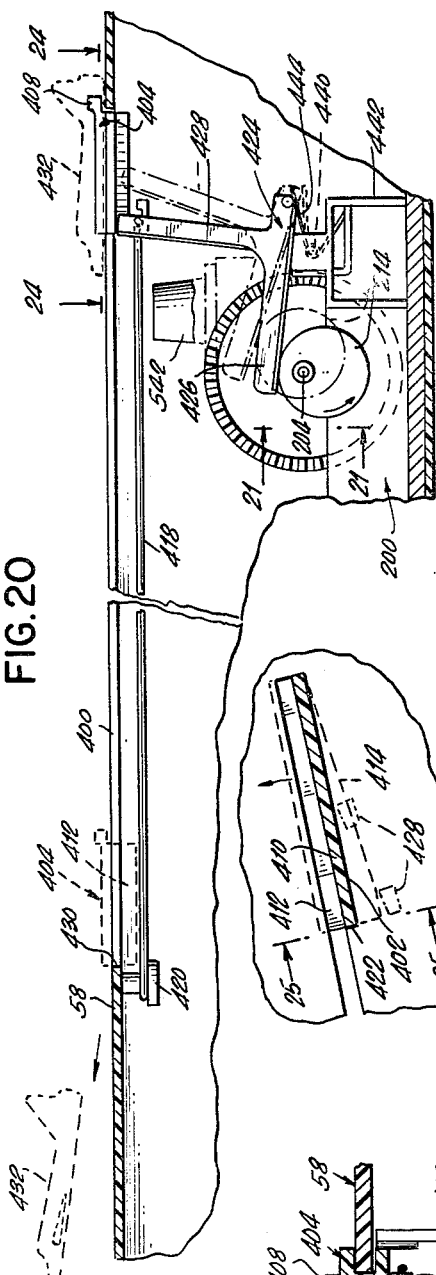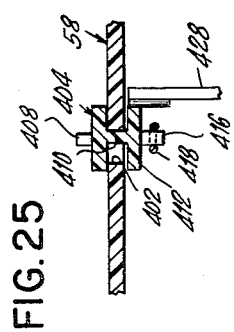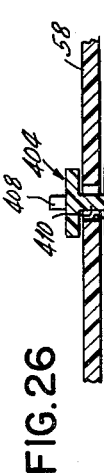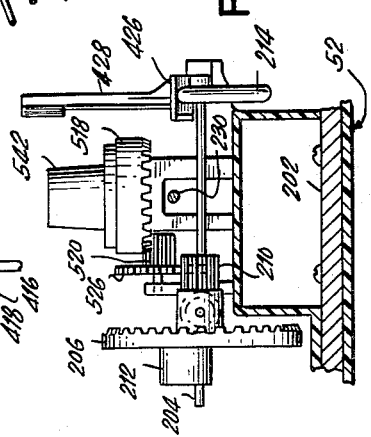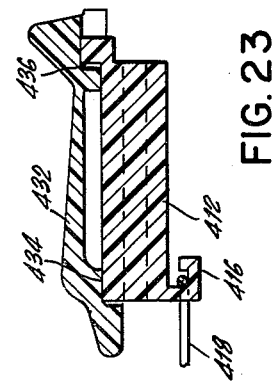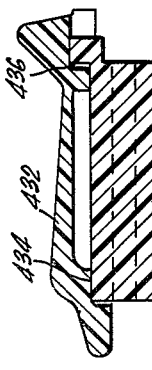

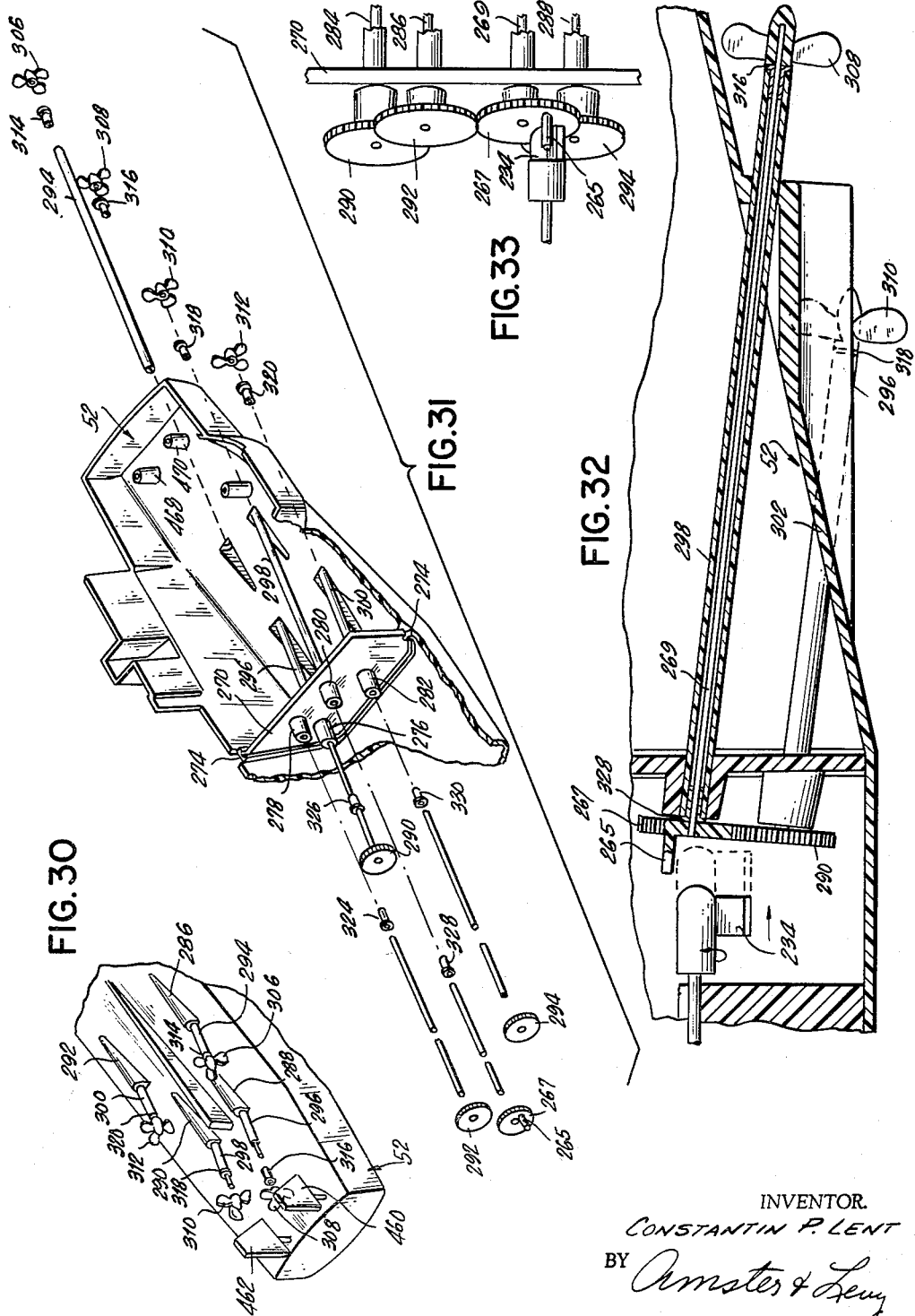

United States Patent Office 3,172,233
Patented Mar. 9, 1965

3,172,233
ELECTRICALLY OPERATED SHIP MODEL
Constantin P. Lent, Forest Hills, N.Y., assignor to Ideal Toy Corporation, Hollies, N.Y., a corporation of New York
Filed Dec. 4, 1961, Ser. No. 156,749
5 Claims. (Cl. 46—244)

This invention relates to an electrically powered model designed for construction by the advanced hobbyist, and more particularly to a realistic model ship which is self-propelled and which has means for controlling the pattern in which the ship model is steered, so as to simulate battle maneuvers while also being provided with electrically operated elevators and an electrically fired catapult.

In order to maintain the interest of the advanced hobbyist in model construction it is necessary to provide a realistic model constructed with the parts thereof being made as close to scale as possible and with great detail, and with the model designed to be self-propelled in simulation of the movements and operations of the full size prototype of the model. It is therefore the primary object of the present invention to provide a complete and detailed kit including numerous different pieces adapted to be assembled to produce a model incorporating faithful reproduction of the prototype.

It has long been recognized that a model incorporating movable features and simulations to the movable portions of the full sized prototype are far more effective to stimulate the imagination of a child or adult playing with such model than a similar model lacking such movable assemblies. For example, in a ship model as disclosed herein, it is desirable to provide propulsive power in the form of rotating screw propellers in simulation of the screw propellers on a full size ship. Still further, the model is improved by providing a motor to drive the screw propellers from within the hull of the ship model. In addition, means provided for steering the ship model so that it will execute simulated battle maneuvers should be substantially automatic. Further, in a ship model of an aircraft carrier, the model is much improved by realistically providing means for launching simulated aircraft from the deck of the ship model while in addition, means simulating the elevators of the aircraft carrier should be provided to add interest to the operating assemblies of the ship model.

The present model is patterned after a full sized prototype having moving parts. In addition to the model being designed so that moving members are incorporated into the model, it is also desirable that the mechanical elements which produce such movements be visable to and capable of being assembled by the person constructing the model or playing with the completed model. Such features provide a distinct educational feature involving the mechanism assembly from a group of different parts and further provide an understanding of the mechanical workings of moving machinery. The extraordinary educational value of such kit assemblies is well recognized by parents, educators, and by the manufacturers involved in this activity in the toy industry.

It is most important to provide a very close resemblance to the full size prototype of the model involved, the closer to the full size prototype that a model is in detail and in relative size of parts, the more stimulated is the imagination of the person playing with the model and the greater is the educational experience provided in the assembly of the model and in the playing therewith.

Another object of the invention is to provide a ship model with means for operating elevators in a realistic manner similar to that of the actual operation of an elevator on a full size aircraft carrier.

An additional object of the invention is to provide a ship model with a suitable drive for a plurality of screw propellers with the shaft for driving the screw propellers extending through the hull with the hull remaining substantially watertight.

A further object of the invention resides in the provision in a ship model of means for operating a catapult and for triggering the release of the catapult forming a part of the model.

A still further object of the invention lies in the provision of means for automatically steering a self-powered ship model to simulate battle maneuver patterns in a realistic manner.

A still further object of the invention is to provide a self-propelled and electrically powered ship model which employs a single electric motor to drive screw propellers, elevators, a rudder assembly and a catapult actuating mechanism.

One of the features of construction of this invention is a novel electrical drive for the screw propellers of the ship model. A plurality of shafts having screw propellers thereon extending outside the hull for propelling the ship model are provided as are a plurality of gears on the shafts in the hull which are meshed with each other. A clutch is provided for detachably connecting an electric motor within the hull to one of the gears for driving all of the shafts and the propellers. In order to assure water tight relationship of the shaft with respect to the hull, the shaft extends through stern tubes at an angle downwardly and rearwardly and mounting tube are provided which surround the shaft within the stern tubes. Eyelets are used for forming bearing connections between the shafts and the mounting tubes which are substantially watertight and a watertight seal is provided between the mounting tubes and the stern tubes in the form of a suitable material such as an adhesive plastic or the like.

Another assembly of marked importance in the invention is the means provided for operating the elevators. This means is connected to the electric motor which drives the screw propellers by a clutch assembly and includes a parallelogram linkage which is pivotally connected to the elevators. A cam is used for rocking the parallelogram linkage by means of a cam follower on the parallelogram linkage engaging the cam so that rotation of the motor causes rotation of the cam and hence upward movement of one of the elevators and downward movement of another of the elevators corresponding to the rocking action of the parallelogram linkage.

The construction of the disclosed and illustrated embodiment of the invention also features an arrangement for steering the ship in simulated battle maneuvers which employs a cam rotated by the electric motor and which is engaged by a cam follower forming a part of a rudder linkage assembly connected to the rudders so that dependent upon the contours of the cam, the rudders will turn thereby steering the ship model. Of course, the cams are adapted to be readily replaceable by a cam having a different contour thereby enabling the ship model to be played with with suitable battle maneuvers being carried out dependent upon the particular cam installed in the ship model.

The deck of the carrier is provided with suitable simulated catapult means in the form of a dolly which is slideable along a slot in the deck and which is urged by a rubber band or other elastic member towards a launched position with the catapult being held in a cocked position by engagement within a notch in the deck. Driven by the electric motor in the hull of a ship is a catapult releasing mechanism in the form of a cam actuated double-arm lever which engages the dolly to move the dolly from the notch and into the slot thereby releasing the dolly to slide along the slot.

One of the special features of the invention is that the rudder linkage and cam assembly, the catapult releasing assembly, and the actuating cam for the parallelogram linkage for the elevator are all controlled by the same clutch and are all driven through the same gear assembly by the motor. Thereby, engagement of the clutch and the switch for the motor will cause all of these elements to operate.

Still further objects and features of this invention reside in the provision of a ship model that is realistic in detail, making use of mostly molded parts of polystyrene or like material, which is adapted to be assembled by a relatively advanced model maker utilizing polystryrene adhesive cement and the like, and which is relatively inexpensive to produce thereby permitting manufacture of a kit at a cost capable of being met by most model makers, thereby enabling the model and the kit therefor to afford considerable amusement, entertainment, and educational instruction to a great number of people.

These, together with the various ancillary objects and features of the invention, which will become apparent as the following description proceeds, are attained by this ship model, a preferred embodiment of which is illustrated in the accompanying drawings, by way of example only wherein:

FIG. 1 is a perspective view of an embodiment of the invention showing a ship model which realistically simulates the appearance of the air-craft carrier "U.S.S. Enterprise;"

FIG. 2 is an enlarged perspective view of the ship model showing the flight deck in plan and illustrating the catapult and elevators forming two of the important constructional features of the invention;

FIG. 3 is a perspective view of the ship model with parts thereof broken away to show other parts in detail and with certain parts being shown in exploded relationship, and with the flight deck of the ship model being removed to allow inspection of the various mechanical elements of the invention;

FIG. 4 is a perspective view of the motor, parallelogram linkage, gear assembly, and rudder control linkage with parts thereof being shown in exploded view so that the operating elements of the invention may be more readily understood;

FIG. 5 is a plan view of the rudder linkage, the cam and cam follower, and the means for driving the cam, forming the assembly for steering the ship model;

FIG. 6 is a view similar to FIG. 5 but showing the parts in a different position of operation by the cam;

FIG. 7 is a perspective view of the rudder assembly and a portion of the rudder linkage;

FIG. 8 is a vertical sectional view taken transverse the stern of the ship model showing the rudder assembly in rear elevational view;

FIG. 9 is a partial vertical sectional view of a portion of the ship model illustrating the rudder assembly in side elevational view;

FIG. 10 is a perspective view of a set of cams employed in the present invention for controlling the rudder linkage and rudder assembly;

FIG. 11 is a schematic diagram illustrating the manner in which the ship will turn to maneuver in a figure 8 maneuver employing one of the cams;

FIG. 12 is a plan view of the motor, gear train, drive means for the various operating elements of the invention, and the clutch assemblies employed shown with the clutch cover removed;

FIG. 13 is a plan view of the clutch cover or housing;

FIG. 14 is a sectional detail view of one of the clutch assemblies taken along the plane of line 14—14 in FIG. 12;

FIG. 15 is a partial sectional view through a portion of the ship model illustrating the parallelogram linkage for the elevators in side elevational view;

FIG. 16 is a view similar to that of FIG. 15 illustrating the parallelogram linkage in a locked position with one of the elevators being raised and the other elevator being lowered;

FIG. 17 is an enlarged vertical sectional view taken along the plane of line 17—17 in FIG. 15 illustrating in particular the construction of the means for rocking the parallelogram linkage of the elevators;

FIG. 18 is a sectional detail view taken along the plane of line 18—18 in FIG. 15 illustrating a portion of the parallelogram linkage;

FIG. 20 is a partial vertical sectional view of the ship model illustrating the catapult and releasing means therefor in elevation and illustrating in solid lines the cocked position of the catapult and in phantom lines the released position of the catapult;

FIG. 21 is a vertical sectional detailed view taken along the plane of line 21—21 in FIG. 20 illustrating the drive means for the releasing means of the catapult and illustrating in elevational view the cam which controls the rudder linkage;

FIG. 22 is a perspective view of the dolly forming one of the important elements of the catapult;

FIG. 23 is a longitudinal sectional view through the dolly and model aircraft mounted thereon;

FIG. 24 is a horizontal sectional view through the dolly illustrating in plan a portion of the deck of the model and illustrating in phantom lines the manner in which the dolly is moved from the notch in the deck to the slot in the deck so that the dolly is relased;

FIG. 25 is a partial vertical sectional view taken along the plane of line 25—25 in FIG. 24 illustrating the position of the dolly in the notch with the catapult in the cocked position;

FIG. 26 is a view similar to that of FIG. 25 but illustrating the dolly as it is being pushed into the slot when the catapult is released;

FIG. 30 is a partial perspective view looking at the underside of the stern of the ship model illustrating the stern tubes, mounting tubes, shafts, screw propellers, and rudder assemblies;

FIG. 31 is an exploded partial perspective view of the ship model illustrating the means for providing propulsion of the ship model;

FIG. 32 is an enlarged partial, vertical sectional view through the hull of the ship model illustrating details of the mounting for the screw propellers of the ship model; and, FIG. 33 is an enlarged partial plan view illustrating the intermeshing gears for driving the shafts on which the screw propellers are mounted.

Figure 27:
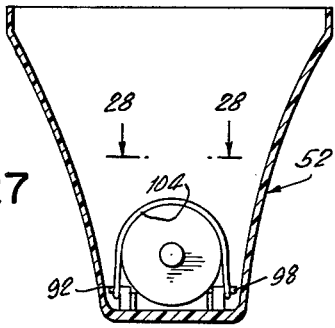
FIG. 27 is a vertical sectional view of a portion of the hull of the ship model illustrating in front end elevational view the manner in which the batteries are mounted in the hull.

With continuing reference to the accompanying drawings wherein like reference numerals designate similar parts throughout the various views, and with initial attention directed to FIGS. 1 through 3 of the drawings, reference numeral 50 is used to generally designate the illustrated embodiment of the invention which is in the form of a model of the aircraft carrier "U.S.S. Enterprise." It is to be recognized that the mechanisms and assemblies utilized in this model can be equally well adapted for use in models of other types and classes of ships, aircraft or land vehicles and that they are shown in conjunction with a model of an aircraft carrier for illustrative purposes.

It is the concept of this invention to mold most of the parts of this ship model out of synthetic plastic material, such as polystyrene or the like. It is to be noted that certain of the elements of the invention including shafts, the electric motor, batteries and wires, and bearings for the screw propellers are formed of metal. Other than a few screws or like fasteners, the model is preferably otherwise formed of polystyrene and it is to be noted that in assembling the model, a polystyrene cement should be used to prevent warping of the parts of the model.

The ship model 50 is provided with a hull 52 suitably molded out of polystyrene or other synthetic plastic material conforming in reduced scale to the contours of the actual full size aircraft carrier "U.S.S. Enterprise." A flight deck 54 is detachably secured to the hull 52 by screws or other fasteners so that the interior of the hull is readily accessible. The flight deck 54 is preferably formed in several sections 56 and 58 so that only one portion of the flight deck need be removed for replacement of batteries, repairs or adjustment to parts, and inspection of the various working elements of the invention.

Mounted on the flight deck section 58 is a bridge and conning tower assembly 60 constructed of any suitable number of parts in accordance with conventional model making practices and which simulate the corresponding parts of the prototype. The sections 56 and 58 of the flight deck 54 are provided with recesses 62, 64, 66 and 68 therein along the periphery of the flight deck for receiving elevators 70, 72, 74 and 76.

In order to provide the source of electrical power for this motorized ship model there are provided a pair of spaced racks 78 and 80 which are fitted in the forward portion of the hull 52 an which, as can be seen in FIG. 3 and FIGS. 27 through 29, are designed to mount batteries 82, 84, 86. The batteries 82, 84 and 86 are of a conventional C-type dry cell and are mounted in series with the respective terminal contacts engaging spring terminal clips 88 and 90 mounted in the hull. Each of the racks 78 and 80 have outward lugs 92, 94, 96 and 98, 100 and 102 respectively which cooperate with each other in providing means for engaging rubber bands 104, 106, and 108 which are passed over the lugs and then about the batteries to hold the batteries in place.

Figure 29:
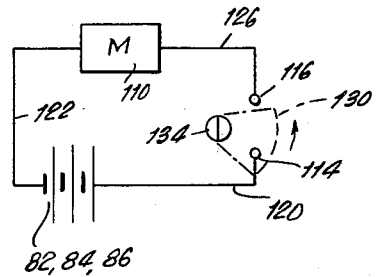
FIG. 29 is a schematic wiring diagram of the electrical circuit employed in the invention.

Referring now to FIGS. 3 and 29, it will be noted that the batteries 82, 84 and 86 are connected to and used to power the electric motor 110 by simple circuits controlled by a switch assembly 112. The switch assembly includes a pair of contacts 114 and 116 in the form of eyelets fastened to a mounting block 118 molded of suitable material such as polystyrene. A wire 120 is connected to the terminal clip 88 and to the fixed contact 114. Connected to the other terminal clip 90 is a wire conductor 122 which in turn is connected to one terminal 124 on the motor 110. Another wire 126 is connected to the terminal 128 of the motor 110 and to the contact 116. A switch plate of electrically conductive material indicated at 130 and which is provided with an overlying plate 132 of insulative polystyrene is designed to overlie the contacts 116 and 114 thereby completing an operative electrical circuit between the motor 110 and the batteries. The switch plate 130 is mounted on a shaft 134 forming a part of the switch assembly 112 which extends upwardly above the deck section 58 through an opening 186 therein and is provided with a notched upper end 138 onto which a handle 140 shaped to simulate an aircraft is detachably secured so that rotation of the handle 140 will cause rotation of the shaft 134 and hence move the switch assembly so that the switch plate 130 which normally overlies the contact 114 will also overlie the contact 116 to complete an operative electrical circuit between the motor 110 and the batteries to cause operation of the motor.

Figure 19:
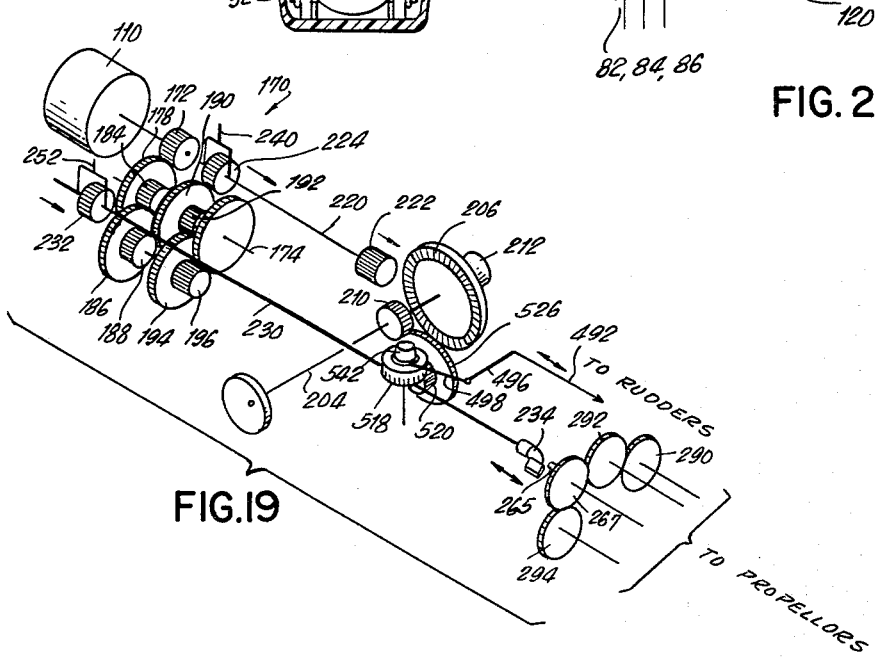
FIG. 19 is a schematic perspective view of the gear train and gears employed in the ship model for driving various moving parts thereof.
Figure 28:
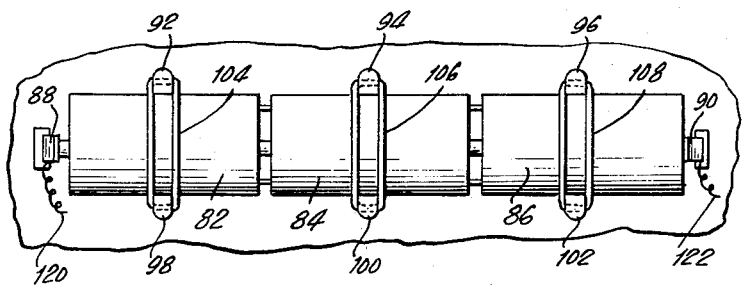
FIG. 28 is a partial plan view of hte model looking along the plane of lines 28—28 of FIG. 27 illustrating the mounting arrangement for the batteries.

The simple electrical circuit shown in FIG. 29 serves to control operation of the mechanisms of the ship model through a drive assembly generally indicated by reference numeral 170, the structure of which can be seen best in FIGS. 4, 12 and 19.

The motor 110 drives a pinion 172. A shaft 174 is journalled in supporting bearing blocks 176. Mounted on the shaft 174 is a gear 178 which meshes with the pinion 172. Integrally formed with the gear 178 is a pinion 180 which thereby rotates with the gear 178. There is also provided a shaft 182 which is journalled in suitable supports 184 and which has rotatably mounted thereon a gear 186 provided with a pinion 188 integral with the gear 186 and rotatable therewith. The gear 186 meshes with the pinion 180 and is rotated thereby with the rotational speed of the gear 186 being reduced from that of the gear 178. Meshing with the pinion 188 is a gear 190 having a pinion 192 integrally formed therewith. The gear 190 and pinion 192 are mounted on the shaft 174 and in return are rotated at a lesser rotational speed than that of the gear 186. A gear 194 is mounted on the shaft 182 and has integrally formed therewith or affixed thereto a pinion 196 which is in mesh with a gear 198 on the shaft 174.

All of the various operating elements of the ship model are driven by either the gear 198 or by the gear 186 in a manner to be hereinafter explained.

The various gears and pinions are preferably molded of polystyrene and are all mounted in a suitable base 200 which has a number of parts such as the supports 176 and 184 integrally formed therewith. The base 200 is secured by screws or other suitable means to a ballast plate 202 which is suitably positioned and fixed to the hull 52 to thereby provide proper seaworthy characteristics for the model. The motor 110 is mounted on the base as is the switch rod or shaft 134.

Journalled in suitable supports on the base 200 and extending transversely of the hull of the ship model is a shaft 204 which has a ring gear 206 fixed thereto. Integrally formed with the hub 208 of the ring gear 206 is a pinion 210 and integrally formed with the ring gear 206 is a cam 212. Fixed on the end of the shaft 204 opposite the cam 212 is an eccentric or cam 214.

Slidably mounted in supports 216 and 218 integrally formed with the base 210 is a clutch shaft 220 which is adapted to be moved parallel to the longitudinal axis of the hull. A pinion 222 is mounted on one end of the shaft 220 and a drive pinion 224 is also mounted on the shaft 220. The pinion 224 is adapted to slide into mesh with the gear 198 for driving the shaft 220 and hence the pinion 222. When the gear 224 is in mesh with the gear 198, the pinion 222 is in mesh with the ring gear 206 to rotate the ring gear 206.

Mounted on the shaft 220 is a pinion 224 which is adapted to engage the gear 198 to drive the gear 198 when the shaft 220 is in its rearmost position. The shaft 220 is moved through the use of a clutch assembly including a yoke 240 which is adapted to engage the stops 242 and 244 on either side of the yoke, the clutch assembly is actuated by a lever 246 which extends upwardly so that forward movement of the clutch lever 240 will move the yoke and hence the pinion 224 and pinion 222 rearwardly to engage these pinions with the gears 198 and ring gear 206 respectively.

Also rotatably and longitudinally mounted on the base 200 is a clutch shaft 230 which has a pinion 232 fixed thereto and also has a driving pawl 234 at the end thereof remote from the pinion 232. The driving pawl 234 is adapted to function to drive the shafts of the screw propellors providing the self propulsion of this ship model in a manner to be hereinafter described.

Means are provided for moving the shaft 232 longitudinally with respect to the axis of the ship model and include a clutch assembly provided with a yoke 254 controlled by a clutch lever 252 which yoke is adapted to engaged stops 256 formed at either side of the pinion 232. The clutch lever 252 as well as the clutch lever 240 extend upwardly through suitable slots, not shown, in the gear housing 250 and through slots 262 and 248 formed in the clutch housing 260. The slot 262 as notches 264 and 266 communicating therewith and the clutch lever 252 is provided with a detent 268 which is adapted to engage in either of the notches 264 and 266 to determine the position of the clutch lever 252 and hence the position of the shaft 230. When the shaft 230 is in the position as shown in FIG. 12, the driving pawl 234 is not in engagement with the detent 265 and the pinion 232 is disengaged from the gear 186. However, when the clutch lever 252 is moved to the position as shown in FIG. 13, since it is pivoted on pin 340, the yoke will move rearwardly carrying the pinion 232 in interengagement with the gear 186 and the driving pawl 234 into engagement with the detent 265 to rotate the gear 267.

Referring now to FIGS. 32 and 33 it will be noted that the hull 52 is provided with a bulkhead 270 which is fitted in a channel 274 integrally molded with the hull 52. The bulkhead 270 has integrally molded therewith cylindrical projections 276, 270, 280 and 282 which are adapted to provide mounting means for the shaft 284, 286, 269 and 288. The shaft are mounted thereon gears 290, 292, 267 and 294 respectively and the respective gears are in meshed relationship with the gears 292 and 294 being driven by gear 267 and the gear 290 being driven by the gear 292 so that rotation of the gear 267 by engagement of the driving pawl 234 with the detent 265 will cause rotation of all of the shafts 284, 286, 269 and 288.

The shafts extend through stern tubes 286, 288, 290, and 292 integrally molded with the hull 52. In order to suitably mount the shafts there are provided mounting tubes 294, 296, 298 and 300 which are fixed in the stern tubes and within the cylindrical projections 276, 278, 280 and 282 by means of polystyrene cement which also forms a watertight seal.

Mounted on the shafts 284, 286, 269 and 288 are screw propellers 306, 308, 310 and 312. These propellors are preferably force fitted in place and are rotated with the shaft to provide the propulsion for the ship model. Eyelets 314, 316, 318 and 320 are fitted in the tubes 294, 296, 298 and 300 to space the lower ends of the shafts 284, 286, 269 and 288 from the tubes and to also provide a seal. The upper end of the shafts are provided with eyelets 324, 326, 328 and 330 which serves the function to provide bearing mountings for the shaft and to space the respective shaft from the tubes and also to provide bearings for the gears 290, 292 267 and 294.

It is noted that the tubes 294, 296, 298 and 300 extend angularly downwardly and rearwardly from a position above the water line at the bulkhead 270 to a position sufficiently below the hull portion 302 so that the screw propellers 306, 308, 310 and 312 will revolve clear of the bottom portion 302 of the hull 52. Further, because the upper ends of the tubes and the shaft are above the water line of the ship, even though the watertight seals were to be broken there will be no flow of water into the hull 52.

Referring now to FIGS. 12 through 14, it will be noted that the clutch lever 240 is pivoted by means of a pin 342 in a like manner to the way the clutch lever 252 is pivoted by means of the pin 354 and the clutch lever 254 is provided with a detent 344 adapted to engage within either of the notches 346 or 248 communicating with the slot 248 to hold the clutch lever 240 in a selected position. As can be seen in FIG. 14 the clutch lever when pivoted about the pin 32 causes the yoke 242 to engage the stops 244 at the ends of the pinion 244 to move the pinion 244 and hence the shaft 220 longitudinally with respect to the axis of the model so that the pinion 222 engages the ring gear 206 to drive the ring gear 206. The ring gear 206 upon rotation thereof will also rotate the cam 212 which causes actuation of the elevator assemblies 72 and 74, it being noted that the elevator assemblies 70 and 76 may be stationary and fixed to the hull 52 by means of polystyrene cement or other fastening means in any convenient manner simulating the relative position of the elevators of the prototype. The elevator assemblies 72 and 74 are driven through the cam 212 by means of a parallelogram linkage arrangement 360.

As can be seen in FIGS. 4, 12 and 15 through 18, there is mounted in the hull 52 a vertical elevator plate 362 to which shafts 264 and 266 are rotatably mounted. Pivotally mounted on the shafts 364 and 366 are a pair of links 368 and 370. Depending from the link 370 is a cam follower 372 which is adapted to surround and thus follow the cam 212 mounted on the shaft 204. Links 374 and 376 are pivoted to the link 370 by means of pins 378 and 380 and are also pivoted to the link pin 68 by means of pins 282 and 284. Hence, rotation of the shaft 204 will cause rotation of the cam 212 about the shaft 204 as an axis and causing a rocking action shown in FIG. 16 both in solid and phantom lines to occur.

The links 374 and 376 are constrained to move vertically due to the fact that the pins 364 and 366 fix the links 360 and 370 and these links move parallel to each other causing the links 374 and 376 to move in a vertical path. Connected to the links 374 and 376 are brackets 386 and 388 which may be pivoted to the links 374 and 376 and which are clamped between bracket sections as at 390, 392 for each of the elevator assemblies 72 and 74 so that these bracket assemblies form suitable surfaces on which the elevator platforms 394 can be secured. The elevator platform 394 carry guide lugs 396 (FIG. 12) which are adapted to be engaged in grooves 398 formed in the hull 400 or in brackets fixed to the hull so that the movement of the eleveator will be constrained.

The operation of the elevator assemblies 72 and 74 is caused by the motor 110 driving the pinion 172. When the clutch lever 240 is pulled forwardly, it moves the pinion 244 into engagement with the gear 198 and the pinion 222 into engagement with the ring gear 206. This causes the ring gear 206 to be driven rotating the cam 212 which in turn rocks the parallelogram linkage to raise one of the elevator assemblies 72 and 74 while lowering the other elevator assembly and continuously successively lowering one elevator assembly and raising the other elevator assembly.

As can be seen in FIG. 2, the flight deck section 58 is provided with an elongated slot 400 therein. A notch 402 is formed in the slot at the rearmost end thereof and communicates with the forms an enlargement of the slot 400. The slot 400 and notch 402 are for the purpose of guiding the dolly 404 which can be seen best in FIGS. 20 through 26 so as to permit the dolly 404 to function as a catapult.

The dolly 404 includes an upper plate 406 which has a locking lug 408 rising from the rearmost portion thereof. A vertical portion 410 depends from the plate 406 and a bottom plate 412 is integrally formed with the vertically member 410 so as to receive the flight deck section 58 between the upper plate 406 and the lower plate 412. The lower plate has a side 414 which tapers rearwardly and extending below the lower plate 412 is a hook 416. The hook is adapted to have one end of an elastic member such as a rubber band 418 secured thereabout, the other end of the elastic member 418 being fixed to a bracket 420 or other suitable fixture depending from the deck section 58 remote from the notch 402 in the slot 400 and preferentially at the forward end of the slot 400.

As can be readily understood, when the dolly 404 is in the rearmost position and is engaged in the notch 402, the forward face of the vertical section 410 of the dolly will engage the shoulder 422 formed by the slot 402 as seen in FIGS. 24 and 25. The dolly 404 is thus in a cocked position with the elastic member 410 under tension. When it is desired to release the catapult, it is necessary to move the dolly 404 so that it no longer engages the shoulder 422 but is engaged in the slot 400. This is accomplished by a two-arm lever 424 which is arranged at an acute angle relative to the longitudinal axis of the ship model and at a slightly smaller angle with respect to the notch 402. The two-arm lever has a lower arm 426 which is adapted to engage the eccentric 214. The other arm 428 of the two-arm lever 424 is designed to engage the side of the lower plate 414 of the dolly and since it moves at an acute angle relative to the dolly and the slot it will serve to push the dolly as shown in FIG. 26 from the notch 402 and into the slot thus disengaging the dolly 404 from the shoulder 422 and firing the catapult whereupon the tensioned elastic member 418 will snap the catapult forward until the catapult hits the shoulder 430 at the forward end of the slot 400 launching the simulated aircraft 432 which is provided with recesses 434 and 436 therein accommodating the upper plate 406 and the projection 408. With the simulated aircraft 432 in place the catapult is a very good visual simulation of an aircraft on the deck of the carrier. The double arm lever 428 is pivoted at at 440 to a bracket 432 forming a part of the base 200 and a leaf spring 434 is provided for continuously urging the arm 426 against the eccentric 214 so that rotation of the shaft 204 will cause rotation of the cam 214 and the rocking action of the two arm lever 424.

The same clutch lever 240 which places the elevator mechanism in operation serves to place the catapult firing mechanism in operation. When the clutch lever 240 is actuated due to operation of its handle 450 in the form of a simulated fighter plane or the like detachably secured to the upper end of the clutch lever, the pinion 224 is engaged with the gear 198 and the pinion 222 is engaged with the gear 206, driving shaft 204 causing rotation of the eccentric 214 and causing rocking action of the two-arm lever. The catapult is cocked by pulling back upon the dolly and seating it in the notch 402 with the vertical member 410 of the dolly engaging the shoulder 422. Then, with a model plane 432 in place on the dolly, the dolly is ready for launching. Further rotation of the eccentric 214 will cause a rocking connection of a two-arm lever causing the dolly to be shifted from the notch 402 into alignment in the slot 400 and out of engagement with the shoulder 422 so that the elastic member 418 can exert its influence and pull the dolly forwardly along the slot 400. When the dolly engages the shoulder 430 inertia will cause the model plane 432 to fly off the dolly 404. Should the model plane land on the surface of the water, it will float due to the fact that it is formed of a light material such as polystyrene.

Referring now to FIGS. 3 through 12 of this application, there is illustrated herein the rudder control mechanism for controlling the operation of the rudders 460 and 462 which are provided with rudder posts 464 and 466 which extend upwardly through substantially cylindrical projections 468 and 470 integrally molded with the hull, 52. The rudder posts 464 and 466 have their upper ends arranged so as to be of non-circular shape to be keyed to crank levers 474 and 476. The crank levers are pivoted at 478 and 480 to a cross bar 482 so that the operation of the rudders 460 and 462 will be simultaneous. The crank lever 476 is provided with an opening 484 in one arm thereof to which a rubber band 486 or other suitable elastic member is secured, the other end of the rubber band being fixed to a post 488 secured to and integrally molded with the hull of the ship model. The corresponding arm 490 of the other crank lever 474 has an elongated link pivoted as at 494 thereto. One arm 496 of a double arm lever 498 is pivoted to the link 492 as at 500 and is itself pivotally mounted at 502 on a rudder control post 504. The other arm 506 of the double arm lever 498 carries a cam follower 508. The cam follower is adapted to engage a cam 510 which is detachably secured on a drum 514 provided with a key 516 for detachably but non-rotatably mounting the cam relative to and on the drum 514. The drum rotates and is integrally formed with a ring gear 518. The ring gear in turn is driven by a pinion 520 mounted on axle 522 extending transverse of the longitudinal axis of the ship model. The pinion 520 has integrally formed therewith or fixed thereto a gear 526 which meshes with the pinion 210 mounted on shaft 204.

The clutch lever 240 controls the rudders through operation of the rudder control mechanism and rudder linkage. When the clutch lever 240 is in the position so that the motor 110 drives the ring gear 206 the shaft 204 is rotated, rotating the pinion 210 and hence the gear 526 and pinion 520. Rotation of the pinion 520 will rotate the ring gear 518 and hence the drum 514. Mounted on the drum in a detachable manner is the cam 510. The cam follower 508 will cause the rudder or control linkage to move in the manner shown in FIGS. 5 and 6 dependent upon the position of the cam with respect to the cam follower so as to cause pivoting action of the rudder 460 and 462. This can be explained in conjunction with the cam 510. When the dam is in the position as shown in FIG. 5, the rudder is amidships causing the vehicle to proceed on a straight course. However, this will be during a very period or transition period when the rudder is being shifted from a right rudder to a left rudder. When the cam follower 508 engages the flattened portion of the cam, the rudder will be turned so as to steer the ship to the left. On the other hand, when the cam follower engages the widest portion of the cam, the rudders will be pivoted so as to steer the ship to the right as shown in FIG. 6.

It is to be recognized that various types of cams be employed. If the cam is of a suitable size that the cam linkage is not depressed to any extent whatsoever, the ship model will be steered on a straight course. Such a cam is indicated at 540 in FIG. 10. A cam which is of a greater circumference and indicated at 542 will always cause the rudders to turn the ship to the right and thereby will cause the ship to travel in a circle. A cam such as a cam 510 will cause the ship to turn in a figure 8 path indicated at 544 in FIG. 11. Of course the cams can easily cut so that the ship will simulate any battle maneuver desired.

This ship model is designed both to serve as a toy when floating on water or as a toy when used on land. Of course, it is necessary that the propellers turn when used on land so that the drive mechanism is provided with its own clutch assembly for the screw propellers. This clutch assembly is operated by means of the clutch lever 252 through engagement with the handle 550 which is detachably affixed to the clutch lever 252 and may be in the form of a similated fighter plane or the like to provide greater realism for the ship model. When the clutch lever 252 is thrown into the off position, that is a rearward position and engaged in the notch 266, the propellers will not be rotated. However, should the actuating lever 252 be moved to the position as shown in FIG. 13, the pinion 232 will be engaged with the gear 186 and the drive pawl 232 will be engaged with the detent 265. This will cause rotation of the shaft 230 and hence rotation of all of the gears 290, 292, 267 and 294 and hence of all of the shafts 284, 286, 269 and 288 thereby rotating the screw propellers 306, 308, 310 and 312. This forms the propulsion mechanism of the ship model. Of course, the propellers can be stopped even with the clutch in gear by suitably turning the switch lever 134 to an off position.

The vessel may be steered as it is being propelled through the use of the rudder control mechanism by actuation of the clutch lever 240 through manipulation of its handle 450. With the lever 240 in the off-position, the ship will steer dependent upon the position of the rudder control mechanism at the point where the cam follower 508 engages the cam 510 or other cams mounted on the drum. However, as soon as the ring gear 206 is driven through operation of the clutch to shift the shaft 220 to its operative position so that the pinion 224 is driven by the gear 198 and the pinion 220 drives ring gear 206, the drum 514 will be driven by the ring gear engaging the pinion 520 which in turn is rotated in conjunction with the gear 526 engaging the pinion 210 so that the rudder linkage is actuated positioning the rudder in relation to the position of the cam 510 or other cam. The rudder band 486 or other elastic member under tension assures that the cam follower 508 will engage the cam 510.

With the clutch lever 240 in its operating position so as to rotate the ring gear 206, the cam 212 is rotated rocking the parallellogram linkage and raising the elevator assembly 72 while lowering the elevator assembly 74 and then lowering the elevator assembly 72 while raising the elevator assembly 74 in a continuous manner. Of course, the elevator assembly will be actuated at a relatively slow rate compared to that of the screw propellers due to the fact that there is a considerable reduction of speed through the various gears and pinions and through the ring gear 206.

The catapult firing mechanism is actuated through the same clutch lever 240 as is the rudder control mechanism and the elevator control mechanism. Rotation of the ring gear 206 will cause rotation of the shaft 204 and thereby of the eccentric 214 to pivot the two-arm lever 424 thereby urging the dolly 400 into the slot from the notch 402 to release the dolly.

Various details of construction of the ship model have not been specifically set forth due to the fact that these are within the scope of the ability of the advanced model maker. A hatch opening 560 may be formed in the flight deck portion 460 for replaceably positioning a hatch 562 thereon and a latch may be provided for the hatch 562 in the form of a simulated helicopter 564 or deck tractor or the like so that access may be readily had for removal and replacement of the various cams for steering the ship model.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A ship model comprising a hull, a deck supported by said hull, a pair of elevators mounted on said hull, said elevators being movable from a position below said deck to a position flush with said deck, a parallelogram linkage connected to said elevators, means for rocking said linkage connected thereto for simultaneously raising one of said elevators while lowering the other of said elevators, said means including a motor in said hull, a gear mounted in said hull, clutch means detachably drivingly engaging said gear with said motor, a cam driven by said gear and a cam follower on said parallelogram linkage engaging said cam so that rotation of said gear causes said cam to rock said parallelogram linkage.

2. In a toy, means for moving a pair of elevator platforms between a lower to an upper position, from below a deck to a position flush with said deck, comprising a parallelogram linkage connected to said elevator platforms, actuating means rocking said linkage and connected thereto for simultaneously raising one of said elevator platforms in said pair while lowering the other of said elevator platforms, said parallelogram linkage comprising a pair of arms disposed one on top of the other and in spaced relationship to each other, a pivot means upon which each of said arms is mounted to rock, a pair of elevator platform supporting members mounted on said linkage, one elevator platform in said pair mounted on each supporting member, means for pivotably supporting said supporting members on said parallelogram linkage with one member supported to the left and the other to the right of said parallelogram linkage, a cam driven by said actuating means, and a cam follower on one of said pair of parallelogram arms engaging said cam so that rotation of said cam causes said cam to rock said parallelogram linkage.

3. In a ship model having a supporting structure including a hull and a deck mounted upon the hull, the improvement comprising a pair of elevators and mounting and actuating means for said elevators, said elevators including a pair of flat plates forming the bases of said elevators, guide means mounting said bases for vertical movement in said supporting structure between lower positions below the level of said deck and raised positions at the level of said deck, a pair of parallel arms pivotally mounted at their mid-points at first and second pivots spaced one above the other on said supporting structure, a first vertical link of a length equal to the distance between said first and second pivots pivotally interconnecting said arms at one end thereof, a second vertical link pivotally interconnecting said arms at their other ends, mounting members secured to said vertical links interconnected with said elevator bases for moving same in opposite vertical directions in response to movement of said parallel arms, a rotating shaft positioned transverse to said arms and below said first and second pivots, means for driving said shaft, an eccentric cam mounted on said shaft in proximity to said arms, a positive cam follower comprising a member rigidly secured to the lower of said arms and having two follower surfaces in engagement with said cam on opposite sides thereof, said positive cam follower rocking said arms about said first and second pivots in response to movement of said cam thereby raising and lowering said elevators within said guide means.

4. In a ship model having a supporting structure including a hull and a deck mounted upon the hull, the improvement comprising a pair of elevators and mounting and actuating means for said elevators, said elevators including a pair of flat plates forming the bases of said elevators, guide means mounting said bases for vertical movement in said supporting structure between lower positions below the level of said deck and raised positions at the level of said deck, a pair of parallel arms pivotally mounted at their mid-points at first and second pivots spaced one above the other on said supporting structure, link means between said arms for maintaining said arms in parallel relation as they are pivoted about said first and second pivots, interconnecting members between said arms and said bases for moving same in opposite vertical directions in response to movement of said arms, a rotating shaft positioned transverse to said arms and below said first and second pivots, means for driving said shaft, a cam mounted on said shaft in proximity to said arms, a positive cam follower comprising a member rigidly secured to the lower of said arms and having two follower surfaces in engagement with said cam on opposite sides thereof, said positive cam follower rocking said arms about said first and second pivots in response to movement of said cam thereby raising and lowering said elevators within said guide means.

5. In a ship model having a supporting structure including a hull and a deck mounted upon the hull, the improvement comprising a pair of elevators and mounting and actuating means for said elevators, said elevators including a pair of flat plates forming the bases of said elevators, said elevators being movable in said supporting structure between lower positions below the level of said deck and raised positions at the level of said deck, a pair of parallel arms pivotally mounted at their mid-points at first and second pivots spaced one above the other on said supporting structure, a first vertical link of a length equal to the distance between said first and second pivots pivotally interconnecting said arms at one end thereof, a second vertical link pivotally interconnecting said arms at their other ends, mounting members secured to said links interconnected with said elevator bases for supporting same and for moving same in opposite vertical directions in response to movement of said parallel arms, a rotating shaft positioned transverse to said arms and below said first and second pivots, means for driving said shaft, a cam mounted on said shaft in proximity to said arms, a positive cam follower comprising a member rigidly secured to the lower of said arms and having two follower surfaces in engagement with said cam on opposite sides thereof, said positive cam follower rocking said arms about said first and second pivots in response to movement of said cam thereby raising and lowering said elevators.

References Cited in the file of this patent

UNITED STATES PATENTS

| | | |
|---|---|---|
| 1,360,676 | Orkin | Nov. 30, 1920 |
| 2,043,276 | Wellons | June 9, 1936 |
| 2,289,702 | Fast | July 14, 1942 |
| 2,328,041 | Wellons | Aug. 31, 1943 |
| 2,408,757 | Dunlop | Oct. 8, 1946 |
| 2,474,855 | Mimopoulos | July 5, 1949 |
| 2,479,321 | Dana et al. | Aug. 16, 1949 |
| 2,507,544 | Pridgen | May 16, 1950 |
| 2,523,314 | Maxson et al. | Sept. 26, 1950 |
| 2,830,815 | Hawes | Apr. 15, 1958 |
| 2,841,246 | Lamb | July 1, 1958 |
| 2,912,952 | Simmons | Nov. 17, 1959 |
| 2,916,167 | Graham | Dec. 8, 1959 |

FOREIGN PATENTS

| | | |
|---|---|---|
| 166,041 | Australia | Nov. 17, 1955 |

RICHARD C. PINKHAM, *Primary Examiner.*